March 6, 1934.  C. H. NORTON  1,949,512
LATHE FOR RAPIDLY FINISHING A ROTARY WORK SURFACE
Filed Feb. 28, 1930  5 Sheets-Sheet 1

WITNESSES
Edward H. Goodrich
Harold W. Eaton

INVENTOR
CHARLES H. NORTON
BY Clayton R. Jenks
ATTORNEY

March 6, 1934.  C. H. NORTON  1,949,512
LATHE FOR RAPIDLY FINISHING A ROTARY WORK SURFACE
Filed Feb. 28, 1930  5 Sheets-Sheet 2

WITNESSES
Edward H. Goodrich
Harold W. Eaton

INVENTOR
CHARLES H. NORTON
BY Clayton R. Jenks
ATTORNEY

March 6, 1934.    C. H. NORTON    1,949,512
LATHE FOR RAPIDLY FINISHING A ROTARY WORK SURFACE
Filed Feb. 28, 1930    5 Sheets-Sheet 3

Fig. 4

WITNESSES
Edward H. Goodrich.
Harold W. Eaton

INVENTOR
CHARLES H. NORTON
BY Clayton R. Jenks
ATTORNEY

March 6, 1934.    C. H. NORTON    1,949,512
LATHE FOR RAPIDLY FINISHING A ROTARY WORK SURFACE
Filed Feb. 28, 1930    5 Sheets-Sheet 4

WITNESSES
Edward H. Goodrich
Harold W. Eaton

INVENTOR
CHARLES H. NORTON
BY Clayton R. Jenks
ATTORNEY

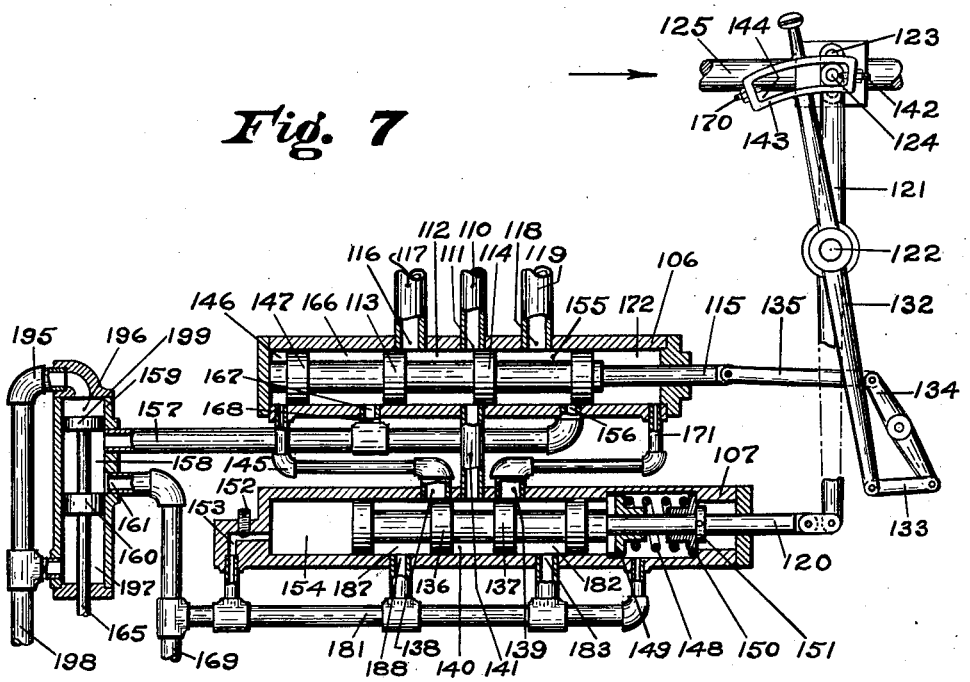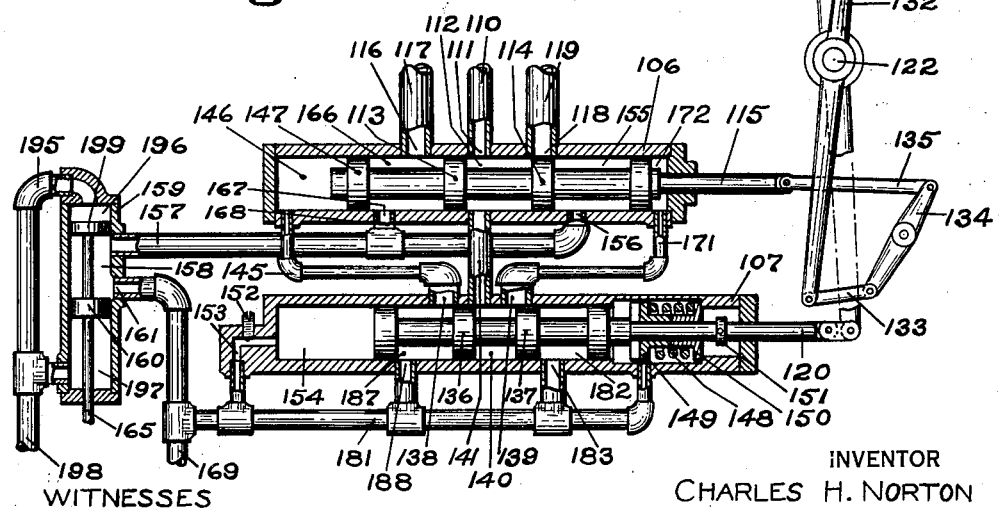

Patented Mar. 6, 1934

1,949,512

UNITED STATES PATENT OFFICE 1,949,512

LATHE FOR RAPIDLY FINISHING A ROTARY WORK SURFACE

Charles H. Norton, Plainville, Conn., assignor to Norton Company, Worcester, Mass., a corporation of Massachusetts Application February 28, 1930, Serial No. 432,224

18 Claims. (Cl. 29—28)

This invention relates to a method for rapidly machining rotating work and a machine tool therefor.

The modern improvements in the art of turning cylindrical or flat surfaced bodies have not resulted in any substantial departure from the old methods of turning or from the type of lathe construction which has been used for many years; but they have merely involved the production of better materials for the cutting tool itself. The lathe has heretofore been so constructed that the cutting tool could traverse along the work very slowly and take a deep or heavy cut in the surface of the revolving work piece. Owing to the extreme hardness of many materials that had to be machined, a wide search has been made to find sharper and harder cutting tools and as a result there has recently been developed a cutting tool made of tungsten carbide granules cemented together by cobalt. This cutting material is fragile and brittle and is not capable of withstanding high pressures, and if the heat of the cutting operation is too high there is a tendency for the metal to fuse onto the cutting tool and so impair its efficiency. In their efforts to make the old-fashioned lathe construction do still more work with this new cutting tool the machine tool designers and operators have been trying to find what is the maximum amount of metal that can be removed in a single cut of the tool and they have failed to grasp the principle that they should work to remove the maximum amount of material in a given unit of time.

It is known that the new tungsten carbide tool is superior to the old tool materials in that it is capable of a greater cutting speed, by which is meant the maximum possible speed obtainable without destroying or materially shortening the life of the cutting edge or point. Since the new cutting materials are frail, it is apparent that taking a deeper cut would require a slower cutting speed, because one must consider not only the strength of both the tool and the work piece but also the pressure effects which tend to create a high temperature and fuse the work material on the tool and stop the cutting action. Hence in their appreciation of the fact that the tungsten carbide tool was capable of taking a higher cutting speed the prior users of this material have attempted to determine just how deep a cut could be taken without impairing the tool and while running it at a higher speed within the capacity of the lathe as heretofore developed. In other words, they have attempted to determine the maximum pressure which the tool could stand at the higher cutting speed.

In accordance with my invention I propose to use the highest possible cutting speed within the capacity of the cutting edge of the tool nose by limiting the pressure of the tool upon the work, and to cut the work by taking a series of light shallow cuts at a high cutting speed by rotating the work rapidly and traversing the tool and the work relatively at a high rate, whereby the hard abrasive material of the cutting tool may be utilized to its maximum cutting capacity without affecting the metal bond which holds the abrasive grains in position and without destroying the cutting tool edge or materially shortening its life of usefulness within the capacity of the individual abrasive grains themselves. In order to obtain the maximum cutting action, I may utilize a multiplicity of cutting tools, if the work piece is long enough to permit such use, and I so arrange these tools that they supplement each other in cutting a wide path upon the work and thus enable the operator to traverse the tool at a rapid rate and to remove the material in a wide shallow path rather than in a deep narrow cut.

It will therefore be appreciated that one object of my invention is to provide a new method of producing round bodies and of turning rotative work pieces which will insure the removal of the maximum amount of material within a given time limit and to utilize the new frail but hard cutting tools efficiently and for a long life of useful service and thereby to reduce the expense of the cutting operation.

A further feature of this invention resides in the fact that it is not efficient to try to cut a smooth cylindrical surface with a lathe tool, since the necessity for having the cutting paths overlap requires a slow rate of traverse of the tool and so increases the length of time required to pass the tool over the work. On the other hand, a grinding wheel is very efficient in removing material from a rough surface, and I can produce a finished cylinder more efficiently by first removing the stock in a lathe but without any attempt at producing a smooth surface, and then grinding the rough surface to the desired finish. In this way I can produce a finished cylinder more efficiently because the grinding machine can remove the helical threads in less time than is consumed when the lathe tool is traversed slowly enough to remove them. It is therefore a further object of my invention to improve the art of producing round bodies by combining a lathe cutting operation with a grinding operation and having each serve only for that portion of the whole machining operation which it can do the more efficiently. To this end, the lathe tool is to be so utilized that it will make only a rough cut whether or not it leaves helical threads or ridges on the work surface, and thereafter this rough portion is to be removed by means of a grinding wheel operated in the usual manner to bring the work down to a desired finished surface. In this way, I may employ a round nosed cutting tool and form shallow grooves therewith which need not overlap the adjacent paths and I may leave the surface as rough as considered proper for the subsequent grinding operation.

By taking a cut under a light pressure and at a rapid rate, I more nearly approach the conditions met in the operation of a precision grinding machine in which the many thousand small abrasive particles in the grinding wheel cut successive minute paths across the piece of work, each particle doing only a small amount of work in itself but the total of the work done by all these particles in a given time representing a considerable sum. In accordance with my method, the modern lathe tools, which may be made of material comparable with the abrasive of a grinding wheel, are employed to produce a multiplicity of light cuts at a high circumferential speed and at a rapid traverse, and I thus keep the fragile abrasive material of the cutting tool from becoming crushed or otherwise detrimentally affected and so enable it to serve a long and useful life.

Moreover, it has been the usual practice in lathe operations to maintain the tool in cutting engagement with the rotating work piece while traversing only in one direction, thus necessitating a slow inoperative return stroke of the cutting tool and making this turning method expensive and wasteful. Also, if the work is light and can be sprung under the pressure of the cutting tool, this condition has often made it necessary to make a light cut at a slow rate of turning and thus has rendered the operation still more inefficient.

It is therefore a further object of my invention to provide a lathe construction which is capable of meeting the ever increasing demands of the machine tool industry for high productive rates and particularly to provide a lathe which will be serviceable for the rapid cutting method as above defined and in which there is a minimum of waste of time in inoperative action.

With this object in view, I propose to maintain each one of the cutting tools in full and operative contact with the work while it is traversing relatively thereto in both directions of travel. Moreover, I so locate the tools on diametrically opposite sides of a cylindrical piece of work that the cutting pressure of one tool will be counteracted by that of the opposite tool and thereby make it feasible to cut light pieces of work without springing the same. If a heavy cut is taken within the capacity of some of the modern cutting tools it is found that oftentimes the centers are incapable of supporting the work against this pressure, but by placing the tools on both sides of the work this pressure is counterbalanced and the work supporting center is thus able to hold the work in its proper position.

As a further feature of my invention, I enable the cutting tool to work in both directions by providing a feeding mechanism for the cutting tool which is actuated at the end of each reciprocation of the tool carriage to cause a predetermined but adjustable infeed of the cutting tool preparatory to its next cutting stroke, thus maintaining the tool in cutting relation with the work during the reciprocation of the carriage in both directions. The rate of reciprocating the carriage will of course depend on the type of work being turned as well as the nature of the cutting tool employed, but it is of the essence of this invention that the cutting tool proceed along the surface of the work at a very high rate, far in excess of that heretofore contemplated for use in lathes where a deep and heavy cut has been taken. Therefore, in accordance with my invention I utilize the speed of the cutting operation and not the depth of cut to accomplish a rapid removal of stock, and in this way I can make use of the cutting ability of the hardest and best of the abrasive or cutting tools which are being developed in this art.

One type of machine capable of accomplishing my method of turning has been illustrated in the accompanying drawings, in which like reference numerals indicate like parts. In the drawings:

Fig. 4 is an enlarged fragmentary diagrammatic view showing the positions of the valves and the associated mechanism when the carriage has just completed its stroke toward the right;

Fig. 7 is an enlarged fragmentary diagrammatic view of the hydraulic mechanism showing the various valve and lever positions while the carriage is traversing toward the right;

Fig. 8 is a similar fragmentary diagrammatic view of the valves showing the position of the valves and the levers at the opposite end of the carriage stroke from that shown in Fig. 4; and Fig. 9 is a fragmentary sectional view showing the speed control valve and its associated parts.

Figure 1:
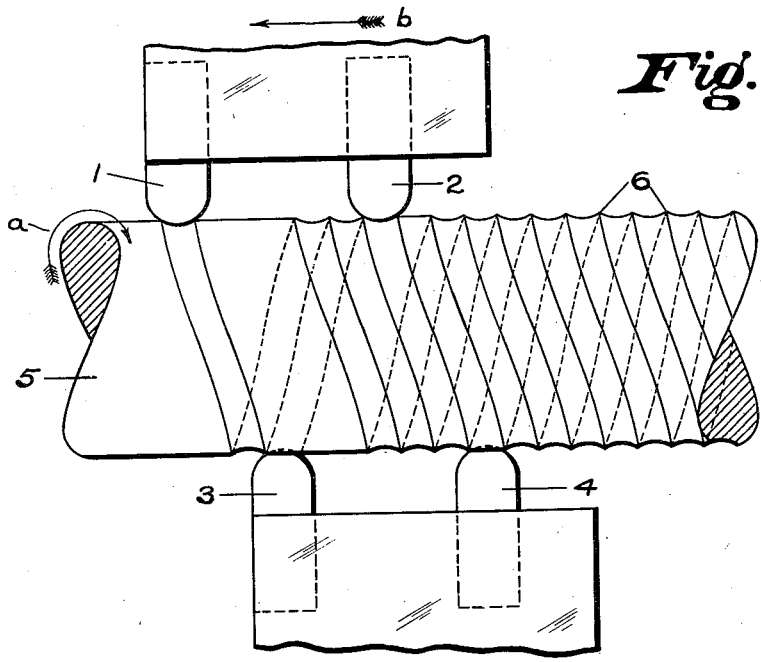
Figs. 1 and 2 are diagrammatic views illustrating my method of producing a round work piece.
Figure 2:
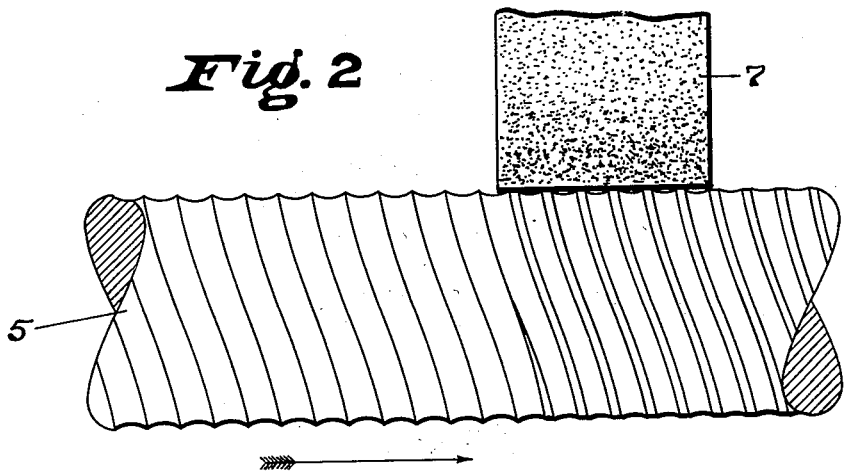
Figure 3:
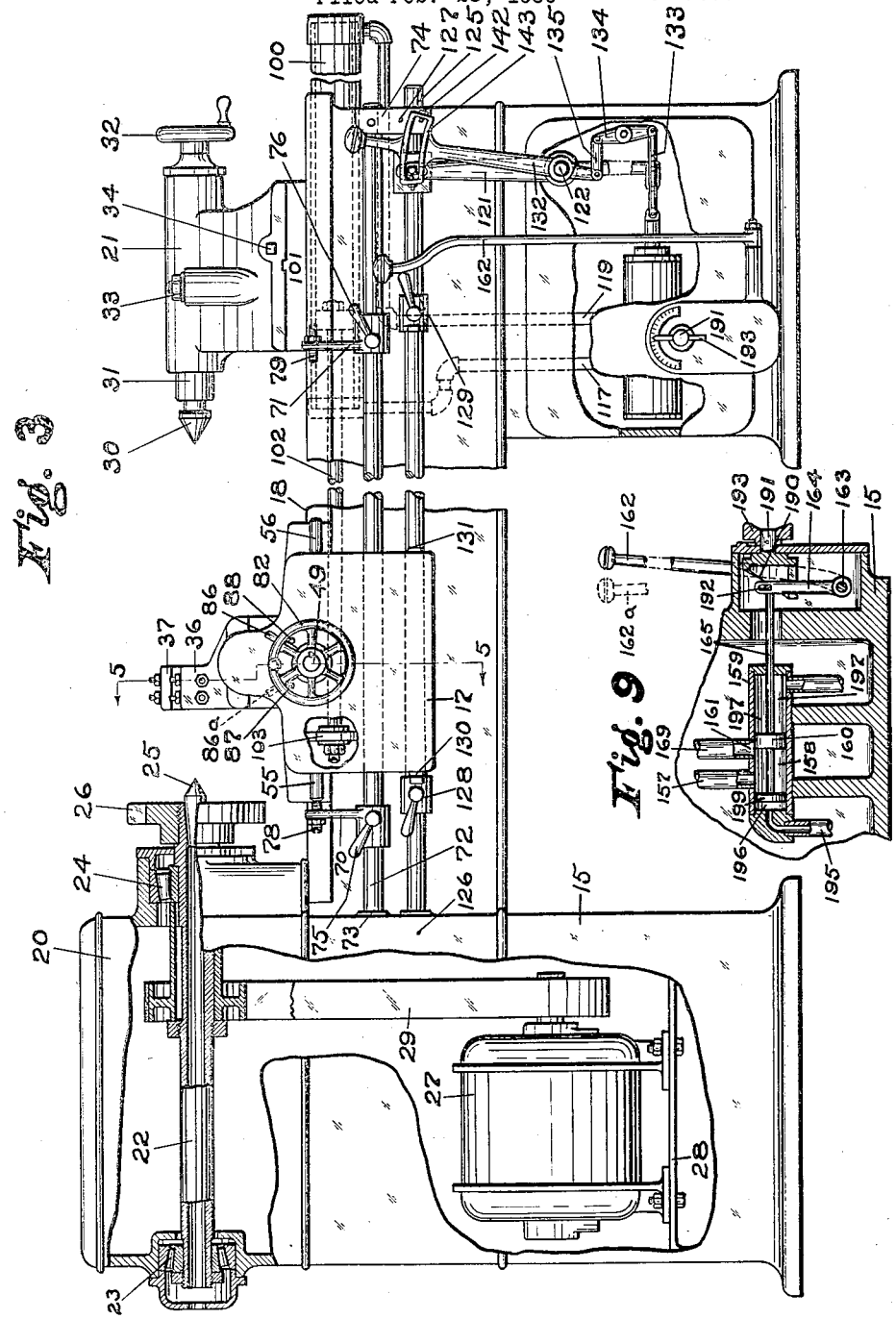
Fig. 3 is a front elevation of a lathe embodying this invention.

In accordance with my invention, as illustrated diagrammatically in Fig. 1, I provide a method of turning in which a cutting tool 1, and preferably a set of tools 1, 2, 3 and 4 as shown in the drawings, are caused to take shallow cuts under a light pressure in the surface of a rapidly rotating work piece 5, as the tools and the work are reciprocated rapidly relative to one another parallel with the work axis. In the drawings, the work is assumed to rotate in the direction of the arrow $a$ and the tools to be moving parallel with the work axis in the direction of the arrow $b$. By using a multiplicity of tools and staggering them on diametrically opposite sides of the work, a wide cut may be taken and the pressures of the cutting operation are balanced. The work is rotated rapidly, as compared with the speed of a lathe which is operated in accordance with standard practice, and the longitudinal traverse of the tool may be so coordinated with the work rotation that the tool paths cover the work surface but do not overlap to any material extent, but the reciprocation may be at any desired rate. Hence by using sharp edged round nosed tools, I may cut shallow grooves which are separated by threads or ridges 6 of material, as shown in exaggerated form in the drawings. These are easily removed by a subsequent grinding operation as diagrammatically illustrated in Fig. 2 in which the grinding wheel 7 is used in the standard manner to traverse repeatedly over the work and rapidly bring the work surface to the desired finish.

The machine illustrated in Figs. 3 to 9 inclusive is a fast cutting or turning lathe provided with a hydraulically operated tool carriage so arranged that it may be traversed a desired distance along the work at any predetermined speed and then reversed at each end of its stroke. The cutting tool and its mounting are constructed so that the tool will take a light rapid cut while traveling in both directions along the rapidly rotating work. Its associated feeding mechanism involves the use of a cross feed screw and a mechanically actuated device connected therewith, which is operated by the movement of the carriage to feed the cutting tool into the work at each end of each stroke. To reciprocate the tool carriage, this machine utilizes a piston and cylinder mechanism which is controlled by a fluid pressure reversing valve. A pilot valve, hydraulically connected thereto to govern the reversing valve positions, is arranged to be mechanically actuated by the carriage so that the carriage may be automatically reciprocated for any desired length of stroke. A manually adjustable throttle valve is utilized to control the rate of travel of the tool carriage in both directions.

As illustrated in the drawings, this lathe comprises a base 15 supporting cutting tools 16 on a carriage 17 which in turn is mounted on the ways 18 and 19 on the base 15. The base also supports a headstock 20 and a footstock 21 which are arranged to rotatably support a work piece. The headstock 20 is provided with a rotatable spindle 22 supported in bearings 23 and 24 in the headstock frame. The spindle 22 is provided with a work supporting center 25 and a face plate or driving member 26. The spindle 22 may be rotated by any suitable source of power, such as for example a motor 27 mounted on a support 28 within the base 15. The motor is connected by a driving belt 29 which engages a pulley on the end of the motor shaft and passes over a pulley fixedly mounted on the headstock spindle 22.

A footstock 21, of any suitable type, may be provided to support the other end of the work piece. This is not considered part of the present invention and consequently has not been illustrated in detail. This footstock may comprise a center 30 mounted on the footstock spindle 31 which is arranged for axial movement by means of a hand wheel 32 to permit adjustment of the center 30 relative to the work piece. The footstock 21 is provided with a suitable screw and binding nut 33 so that the footstock may be adjusted longitudinally on the ways 18 and 19 and then locked in its adjusted position. An adjusting screw 34 is arranged to move the footstock laterally so that the center 30 may be brought into positive alignment with the center 25 after the footstock has been repositioned upon the ways of the machine.

The tool carriage 17 is provided with a cross slide way 35 upon which is mounted the tool cross slides 36 and 37. The cross slide way 35 and the cross slides 36 and 37 fit suitably so that the tools are maintained in proper engagement with the reciprocating tool carriage 17.

To attain one object of this invention a multiplicity of cutting tools is arranged to engage opposite sides of the work and be simultaneously fed into the work as it is reduced in size. As illustrated in Fig. 1, the tools each have two rounded cutting noses which are so shaped as to be capable of removing stock from the revolving work piece when the carriage is traversed in either direction. The two noses on one side of the work are staggered relative to the two noses on the opposite side of the work so that they may cut adjacent paths upon the work piece during its rotation while they are traversed longitudinally thereon. Each tool nose leads slightly in advance of the following one so that the leading cutting nose starts a helical groove which is widened by each following cutter. By utilizing several small staggered cutting tools, as herein illustrated, the pressures exerted upon the work piece are substantially equalized and there is far less tendency to buckle or distort the work piece than if a single large cutting tool were used. It is, of course, understood that various materials, shapes and arrangements may be utilized for the cutting tools within the scope of this invention.

A suitable feed screw 38 is mounted in bearings 39 and 40 in the carriage 17. The screw 38 is provided with two threaded portions, a left-hand thread 41 and a right-hand thread 42 engaging the nuts 43 and 44 on the two cross slide members 36 and 37 respectively. It will be readily apparent from this disclosure that when the screw 38 is rotated in either direction, the tools 16 will be simultaneously moved either toward or from the work piece 45 depending upon the direction of rotation of the screw 38.

The cutting tools 16 may be automatically and simultaneously fed into the work piece to any predetermined extent at the end of each carriage stroke or the automatic feed may be disengaged and a manual feed utilized whenever desired. In order to feed the cutting tools automatically to a definite extent at the end of each reciprocatory stroke of the carriage, a mechanism is provided which is actuated by the movement of the carriage itself just at the completion of its stroke in each direction. As illustrated in the drawings, this construction may comprise a ratchet wheel 48 secured to a shaft 49 which is journaled in a projecting portion of the carriage 17. The shaft 49 is also provided with a gear 51 meshing with a gear 52 on the outer end of the feed screw 38. Thus any rotation transmitted to the ratchet wheel 48 will impose a consequent rotation to the feed screw 38 and simultaneously move the cutting tools toward the work piece. Two ratchet pawls 53 and 54 are mounted on the ends of spring pressed plungers 55 and 56 which are supported for longitudinal movement within bearings in the carriage. The pawls 53 and 54 are normally maintained in inoperative engagement by two springs 57 and 58 which surround the plungers 55 and 56 respectively and are compressed between portions of the carriage and collars 59 and 60 fixed to the respective plungers 55 and 56. The pawls 53 and 54 are mounted to rock upon the studs 61 and 62 which are fastened to heads upon the inner ends of plungers 55 and 56. Springs 63 and 64 are interposed between portions of the heads on the plungers and the extending arms 65 and 66 of the pawls respectively, and serve to rock the pawls against stop pins 67 and 68 which locate the pawls while disengaged from the ratchet wheel. It is thus readily apparent from this disclosure that movement of the plunger 55 to the position illustrated in Fig. 6 turns the ratchet wheel 48 in the direction indicated by the arrow and causes a simultaneous infeed movement of the cutting tools which are interconnected to the ratchet wheel by the gears 51 and 52 and the feed screw 38.

The plungers 55 and 56 may be actuated by any suitable mechanism, such as the dogs 70 and 71 respectively which are preferably adjustably mounted on a bar 72 rigidly supported by a portion of the base 73 and a bracket 74. The dogs are adjustably locked to the bar 72 by clamping screws 75 and 76 so that they may be adjusted longitudinally on the bar and then clamped in the desired position. These dogs 70 and 71 are positioned so that slightly before the carriage 17 reaches the end of its stroke the plungers 55 and 56 will engage the respective dogs 70 and 71 and actuate the pawls 53 and 54. It will be readily apparent that by adjusting the position of the dogs 70 and 71 relative to the reversal point of the carriage, the amount of feeding movement of the tools may be varied as desired, that is, the pawls may be moved through a long or a short stroke depending upon the relative adjustment of the dogs. To facilitate a fine adjustment of the movement of the pawls 53 and 54, suitable adjusting screws 78 and 79 are provided on the dogs 70 and 71 respectively so that the movement of the plungers 55 and 56 may be minutely varied to produce the exact feed desired of the cutting tool at both ends of its stroke of reciprocation.

If the operator desires, he may disengage the automatic feed and employ a manual feeding mechanism which comprises a hand wheel 82 secured to the outer end of the shaft 49. Thus any rotation imparted to the hand wheel is transmitted through gears 51 and 52 to rotate the feed screw 38 and thereby move the cutting tools toward or from the work as desired. To disengage the automatic feed mechanism for manual feeding of the cutting tools, the operator moves two guards into such positions that the pawls 53 and 54 may not engage teeth in the ratchet wheel 48. To accomplish this, a sleeve 83 is rotatably mounted upon the shaft 49. This sleeve has two arms extending therefrom to which are affixed guards 84 and 85 in such positions that as the sleeve is turned the guards may be brought between the pawls 53 and 54 and the adjacent teeth upon the ratchet wheel 48. A lever 86 is secured to the sleeve 83 and arranged to turn it upon the shaft 49. Two stop pins 87 and 88 are mounted in the carriage in such positions as to limit the throw of lever 86 and the position of the guards 84 and 85 moved thereby. Thus when lever 86 is moved to the position 86a, as indicated in broken lines, the guards 84 and 85 assume new positions between the pawls 53 and 54 respectively and prevent their engagement with the ratchet wheel 48 when the plungers 55 and 56 are moved by the dogs 70 and 71.

*Carriage reciprocating mechanism*

The carriage 17 may be rapidly reciprocated by any suitable mechanism such as a fluid pressure device which is arranged so that it may be immediately reversed at each end of its stroke. This mechanism may comprise a fluid pressure cylinder 100 which is supported on the base 15 of the machine. A piston 101 is slidably mounted within the cylinder 100 and is connected by a piston rod 102 to a bracket 103 depending from the tool carriage 17. By controlling the admission of fluid to the chambers 104 and 105, the direction of travel of the tool carriage 17 may be changed as desired.

To reverse the direction of travel of the carriage, a fluid pressure system is provided, which includes a reversing valve 106 connected to the cylinder 100 and a pilot valve 107 arranged to shift the reversing valve and thereby change the direction of flow of fluid to the cylinder 100. A fluid supply tank 108 is provided in the base of the machine, and fluid is pumped from this reservoir by a gear pump 109 (diagrammatically shown in Fig. 4). The fluid passes from the pump through the pipe 110 and port 111 into chamber 112 in the reversing valve 106 between the pistons 113 and 114 on the valve stem 115. The fluid entering the chamber 112 may then either be passed through the port 116 and pipe 117 into the chamber 104 at the left-hand end of the cylinder 100 (Fig. 4), or through port 118 and pipe 119 into the chamber 105 at the right-hand end of the cylinder 100.

The valve stem 115 may be shifted to change the direction of flow of fluid and thereby change the direction of travel of the carriage by a suitable mechanism, or in the preferred embodiment of the invention, it is preferably actuated by movement of the tool carriage to bring the carriage to a stop at a predetermined but adjustable position relative to the work. The pilot valve 107 which serves to move the reversing valve 106 and to start the carriage in the opposite direction is provided with a valve stem 120 connected to a lever 121 pivotally mounted on a shaft 122 secured to the base 15. The upper end of the lever 121 is provided with a slot 123 which engages a pin 124 mounted on a bar 125 slidably supported in the bearings 126 and 127 upon the base 15. This bar is arranged to be shifted longitudinally by adjustable dogs 128 and 129 when they are engaged by the projections 130 and 131 on the carriage 17.

To stop the traverse of the carriage at a predetermined point preparatory to its reversal a suitable lever mechanism is arranged to be actuated in proper timed relation with the lever 121 which automatically shifts the valve stem 120 of the pilot valve 107. This may comprise a lever 132 mounted upon the outer end of shaft 122 on the base 15. The lower end of the lever 132 is connected by a link 133 to one arm of a lever 134. The other end of the lever 134 is pivotally fastened to a link 135 which is connected to the valve stem 115.

During the normal travel of the tool carriage 17, the pilot valve 107 is in a closed or neutral position, as shown in Fig. 7, that is, with the valve pistons 136 and 137 covering the ports 138 and 139 respectively. The chamber 140 between the pistons 136 and 137 is connected by a pipe 141 with the chamber 112 in the reverse valve, so that the pipe line pressure is conveyed through the reversing valve chamber 112 into the pilot valve chamber 140.

As the carriage travels in the direction of the arrow shown in Figs. 4 and 7, the abutment 131 thereon strikes the dog 129 which slides the bar 125 longitudinally toward the right and starts to swing the lever 121. This continues until the pin 124 strikes an adjusting screw 142 in an enlarged portion 143 of the lever 132. The enlarged portion 143 is provided with an elongated arcuate slot 144 which permits movement of the lever 132 for manual control of the carriage traverse when desired. Continued movement of the carriage in the direction of the arrow (Fig. 7), rocks both the lever 121 and the lever 132 to positively move the valve stem 115 until the valve piston 113 closes the port 116 (as shown in Fig.

4) and thereby prevents further traversing movement of the carriage 17.

During this movement of the valve piston 113 into the position to close port 116 the valve stem 120 has moved to the position as shown in Fig. 4 so that the fluid pressure passing into the chamber 112 of the reverse valve 106 passes through pipe 141, chamber 140, port 138 and pipe 145 into chamber 146 at the left-hand end of the reverse valve 106 to move the piston 147 and the valve stem 115 toward the right, as viewed in Fig. 4. The fluid pressure back of the valve piston 147 moves the reversing valve stem 115 toward the right until the port 118 is opened so that fluid may be admitted from the chamber 112 through port 118, pipe 119 into the cylinder chamber 105 at the right-hand end of cylinder 100 (Fig. 4) to start the movement of the table in the reverse direction toward the left.

After the reversal has taken place to start the carriage toward the left, the pilot valve stem 120 is preferably automatically returned to a neutral position where both the ports 138 and 139 are closed, as illustrated in Fig. 7. This may be accomplished by means of a spring 148 interposed between the collars 149 and 150 which are slidably mounted on the valve stem 120. In the neutral position, the collars 149 and 150 engage shoulders within the valve casing 107. When the valves are shifted into the positions illustrated in Fig. 4, the spring 148 is compressed against the collar 150 and through it exerts pressure upon a collar 151 secured to the valve stem 120 tending to force it toward the right to a neutral position. The pilot valve is held in this position by the lever 121 until the carriage is moving in the reverse direction. As soon as the carriage movement is reversed, the abutment 131 recedes from the dog 129 and the released pressure of the spring 148 returns the valve stem 120 to a neutral position, such as shown in Fig. 7.

The return movement of the pilot valve stem 120 to a neutral position is preferably retarded to give ample time for the fluid passing through the pipe 145 to shift the reverse valve stem 115, so that the port 118 is fully opened before the pilot valve 120 reaches its closed or neutral position. To this end, a suitable valve is provided which comprises a screw 152 arranged to throttle a passage 153, thereby serving to create a suction within the chamber 154 and retard the return movement of the valve stem 120 to its central position. This is an important feature, since by adjustment of the screw 152, the return may be delayed or hastened as desired.

During the movement of the carriage in the direction of the arrow, as shown in Figs. 4 and 7, fluid is exhausting from chamber 105, pipe 119, port 118, valve chamber 155, port 156, pipe 157, into chamber 158 in the feed control valve 159. The valve 159 is of the balanced piston type and is provided with a piston 160 arranged to slide therein and permit the port 161 to remain entirely open or partially closed as desired thus controlling the exhaust of fluid from the entire system. This valve may be controlled by any suitable mechanism, such as a lever 162 pivotally mounted on a stud 163 on the base 15. This lever is provided with a second arm 164 connected to a valve stem 165 so that the piston 160 may be manually controlled as desired. When it is desired to stop the machine and prevent reciprocation of the tool carriage, the operator moves the lever 162 toward the machine to position 162a, as viewed in Fig. 9, to move the piston 160 so that it completely closes the port 161 and thereby prevents any exhaust of fluid from the system. Any excess fluid pressure may be relieved by a suitable relief valve which serves to pass fluid from the pump 109 into the exhaust system. By varying the position of the lever 162, the port 161 may be either wide open to give a maximum speed of the tool carriage or partially closed to throttle the exhaust of fluid so that the carriage may be traversed at the desired speed.

When the carriage is traversed toward the left the port 118 is open and admitting fluid under pressure through pipe 119 into chamber 105 at the right-hand end of cylinder 100, and the fluid in the chamber 104 may exhaust through pipe 117, port 116, chamber 166 in the valve 106, through a port 167 and pipe 168, into the exhaust pipe 157 and from there into the chamber 158, through the adjustable throttling port 161, whence it returns through pipe 169 into the supply reservoir 108.

Figure 6:
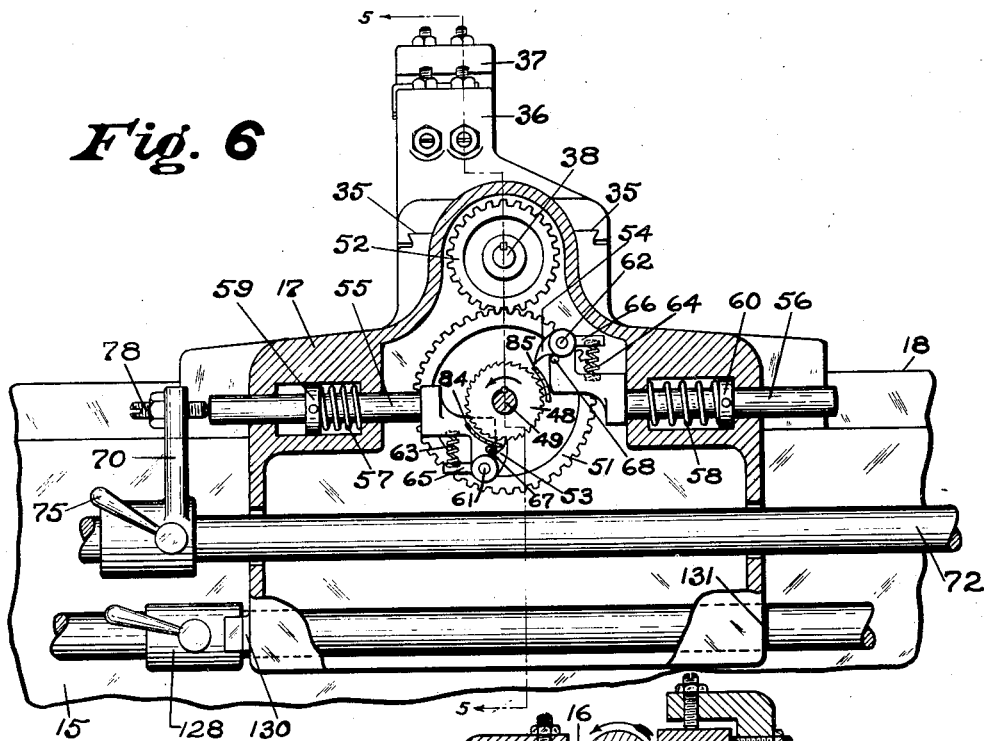
Fig. 6 is a longitudinal sectional view taken approximately on the line 6—6 of Fig. 5.
Figure 5:
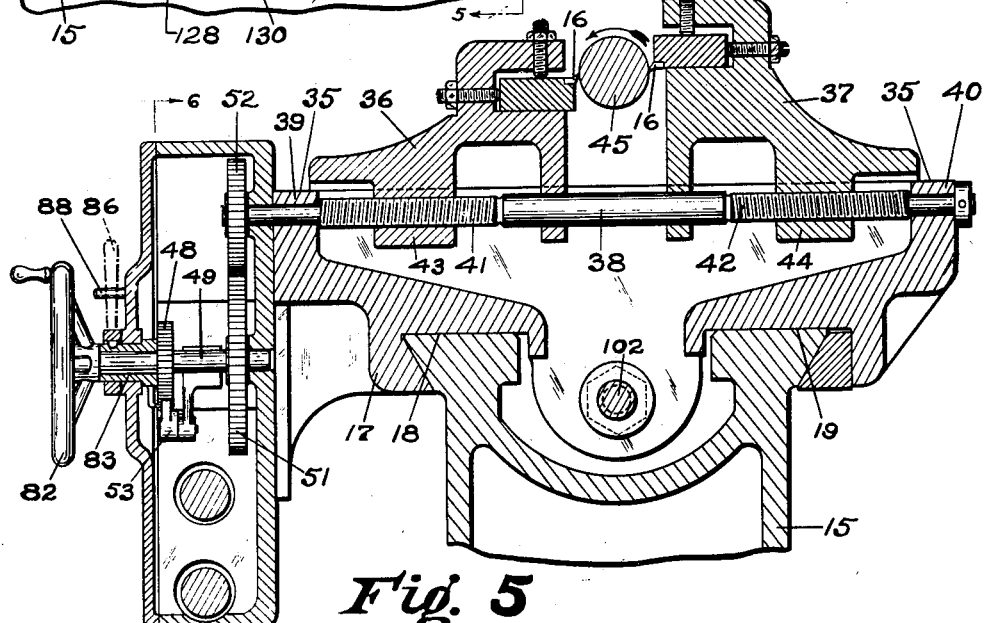
Fig. 5 is an enlarged fragmentary sectional view taken approximately on the line 5—5 of Fig. 3.

Movement of the tool carriage 17 toward the left continues until the abutment 130 on the carriage strikes the dog 128 as shown in Fig. 6 and rocks the lever 121 toward the left to shift the pilot valve stem 120 from a neutral position as shown in Fig. 7 toward the right into the position shown in Fig. 8. Simultaneously with this movement, the pin 124 contacts with an adjusting screw 170 at one end of the enlarged portion 143 of the lever 132 and moves both of the levers 121 and 132 toward the left placing the valve stems 115 and 120 in position so that the piston 114 covers the port 118 and the pilot valve has opened port 139 as illustrated in Fig. 8. When the pistons are in these positions, the carriage is stationary and fluid is being admitted through the pipe 141, chamber 140, port 139, pipe 171, into chamber 172 to shift the reversing valve stem 115 towards the left to the position shown in Fig. 7 and thereby start the table traveling toward the right. After reversal takes place, the pilot valve stem 120 is returned to its neutral position by spring 148 and the reversing valve stem 115 shifts to the position as shown in Fig. 7, so that fluid passing through pipe 110, port 111, into chamber 112, passes through the port 116, pipe 117, into the chamber 104 to move the piston 101 and also the tool carriage 17 in a direction toward the right, as viewed in Fig. 7.

As soon as the table starts moving toward the right, the abutment 130 recedes from the dog 128 and the released pressure of the spring 148 moves the pilot valve stem 120 into a neutral position as indicated in Fig. 7. The chamber 154 at the left-hand end of the pilot valve now serves as a dash-pot to squeeze oil past the valve screw 152 and through the passage 153 into the exhaust pipe 169. This serves to check the return movement of the pilot valve in the opposite direction, and insures sufficient fluid passing through the pipe 171 to shift the reversing valve into the position where the port 116 is fully opened to produce the normal carriage travel in a direction towards the right, as viewed in Fig. 7.

Fluid in the chamber 172 may exhaust through the pipe 171, port 139, chamber 182, pipe 183 and then through pipe 181 and exhaust pipe 169. When the valves are in the opposite position, such as that shown in Fig. 8, and fluid is being forced through port 139 into the valve chamber 172, fluid may readily exhaust from the chamber 146 through the pipe 145, port 138, chamber 187, pipe 188 into the pipe 181 and from there through exhaust pipe 169 into the reservoir.

Speed control

The normal speed of the tool carriage may be controlled by means of the lever 162 which is connected to the valve stem 165 to position the valve piston 160 relative to the elongated port 161 so as to control the exhaust of fluid from the system. When it is desired to stop the traverse of the tool carriage, the operator moves the lever 162 toward the machine, and so moves the valve stem 165 and the piston 160 to cover the port 161 and thereby completely throttles the exhaust. It is desirable to provide a suitable stop for the lever 162 so that the movement of the stem 165 of the valve piston 160 in opening the port 161 may be limited. This permits the operator to set the mechanism for a desired carriage speed and be sure of returning to the same speed after the machine has been stopped. This may be accomplished by providing a cam 190 on a rotatable shaft 191 mounted on the front of the machine base 15. The surface of the cam is so shaped and arranged as to engage a pin 192 projecting from the valve stem 165 so as to limit the movement of the piston 160 toward the front of the machine, as viewed in Fig. 9. By turning a knob 193 secured to the shaft 191, the cam 190 may be turned and adjusted relative to the pin 192 to permit moving the valve piston 160 to uncover the desired amount of the exhaust port 161 and thereby control the traversing speed of the carriage. To facilitate free movement of the piston 160 in the speed control valve, a suitable by-pass is provided which may comprise a pipe 195 as shown diagrammatically in Figs. 4, 7, 8 and 9. The pipe 195 connects a chamber 196 at one end of the valve casing with another chamber 197 at the other end of the valve casing and is connected by a pipe 198 to the exhaust pipe 169 so that any leakage of oil by the pistons 160 or 199 is exhausted and permits free movement of the valve.

The operation of this machine will be readily apparent from the foregoing disclosure. The operator by manipulation of the lever 162 may start or stop the reciprocatory movement of the tool carriage 17 and may by adjustment of the dogs 128 and 129 determine the point of reversal of the cutting tool. By adjusting the dogs 70 and 71 and their respective adjusting screws 78 and 79 relative to the reversing dogs 128 and 129 the operator may vary the extent of infeed of the cutting tool at each end of the carriage stroke. The reciprocation of the cutting tools and their infeed at each end of the carriage stroke continues until the work has been reduced to a predetermined size, whereupon the lathe may be stopped by manipulation of the lever 162. Should the operator desire to utilize the manual feed, he may disengage the power feed by throwing lever 86 to position 86a and feed the cutting tools the desired extent by turning the hand wheel 82.

It is to be understood that the term "lathe tool" as used in the claims is not intended to cover a grinding wheel, but simply relates to a familiar type of cutting tool commonly employed in a turning operation and having a nose or cutting edge especially adapted for a high speed lathe turning operation.

Having thus described my invention, what I claim as new and desire to secure by Letters Patent is:

1. A lathe comprising a rotatable work support, means to rotate said support rapidly, a tool support mounted for movement towards and from the work axis and for reciprocation lengthwise thereof, a cutting tool rigidly fixed thereon and arranged to cut when reciprocated in both directions, means to reciprocate the tool support relative to the work, means to hold said tool with a light pressure against the work during reciprocation of the tool support in both directions, and precision mechanism to feed said tool through a minute distance towards the work axis at either end of a stroke of reciprocation.

2. A lathe comprising a rotatable work support, means to rotate said support rapidly, a tool support mounted for movement towards and from the work axis and for reciprocation lengthwise thereof, a suitable cutting tool rigidly fixed thereon and shaped to cut when reciprocated in both directions, means to reciprocate the tool support relative to the work to produce a rapid cutting operation, means to maintain said tool in light cutting engagement with the work during the reciprocatory stroke in both directions, and means to feed said tool through a minute distance towards the work axis at both ends of the reciprocatory stroke.

3. A lathe comprising a rotatable work support, means to rotate said support, a tool support mounted for movement towards and from the work axis and for reciprocation lengthwise thereof, a cutting tool rigidly fixed thereon and arranged to cut when reciprocated in both directions, means to reciprocate the tool support relative to the work, means to maintain said tool in cutting engagement with the work during the reciprocatory stroke in both directions, means to automatically feed said tool towards the work axis at either end of the stroke of the tool support, and manually operable mechanism for feeding the tool toward and from the work independently of the automatic feeding mechanism.

4. A lathe comprising a rapidly rotatable work support, a tool support reciprocable lengthwise of the work axis and movable towards and from the same, a high speed cutting tool fixed on the tool support and arranged to cut the work when reciprocated in both directions, means for automatically moving the tool support at the end of its reciprocatory stroke to feed the tool into the work, a driving motor and high speed driving connections to rotate the work support at a rapid rate, and mechanism for automatically reciprocating the tool support at a rapid rate which will cause the tool to cut a wide path on the rapidly rotating work commensurate with the effective width of the tool.

5. A lathe comprising a rapidly rotatable work support, a tool support reciprocable lengthwise of the work axis and movable towards and from the same, a multiplicity of high speed cutting tools which engage the work simultaneously and cooperate to cut a wide path upon the work during the reciprocation of the tool support in both directions, means for automatically moving the tool support at the end of its stroke to feed the cutting tools into the work, a driving motor and high speed driving connections to rapidly rotate the work support, and mechanism for automatically reciprocating the tools support at a rapid rate.

6. A lathe comprising a rotatable work support, means to rotate said support at a rapid rate, a tool carriage supported for reciprocation lengthwise of the work, a suitable lathe tool secured thereto and shaped to cut in either direction during reciprocation, means to rapidly reciprocate the tool carriage at a predetermined but adjustable rate independent of the speed of rotation of the work support, and precision feeding mechanism acting periodically to feed the tool forward through a predetermined distance at one end of its reciprocatory stroke and to cause the tool to take a succession of shallow cuts without being withdrawn from contact with the work.

7. A lathe comprising a rotatable work support, means to rotate said support at a rapid rate, a tool carriage supported for reciprocation lengthwise of the work, a suitable lathe tool secured thereto and shaped to cut in either direction during reciprocation, means to rapidly reciprocate the tool carriage at a predetermined but adjustable rate independent of the speed of rotation of the work support, means to maintain the tool in cutting engagement with the work during the carriage reciprocation in both directions, and means actuated by the carriage to automatically feed said tool towards the work at the end of each carriage stroke.

8. A lathe comprising a rotatable work support, a driving motor and connections to rotate the work support at a high rate, a high speed lathe tool, a carriage therefor mounted for reciprocation parallel to the work axis, means to rapidly reciprocate the carriage, dogs adjustably positioned upon the base to limit the extent of carriage reciprocation, means to maintain the tool in cutting engagement with the work during reciprocation of the carriage in both directions, and means to automatically feed the lathe tool toward the work at both ends of the carriage stroke.

9. A lathe comprising a rotatable work support, a driving motor and connections to rotate the work support at a high rate of speed, a carriage mounted for reciprocation upon the base parallel to the work axis, a suitable lathe tool secured thereto and shaped to cut in both directions of carriage reciprocation, dogs adjustably positioned upon the base to limit the extent of carriage reciprocation, means to maintain the tool in cutting engagement with the work during reciprocation of the tool carriage in both directions, and means actuated by the carriage to automatically feed the cutting tool toward the work at a predetermined but adjustable amount at the termination of each carriage stroke.

10. A lathe comprising a rotatable work support, a driving motor connected to rotate the work support at a high rate of speed, a carriage mounted upon the base for reciprocation lengthwise of the work, a lathe tool secured thereto and having a cutting edge shaped to cut in both directions of carriage reciprocation, means independent of the work support driving mechanism to reciprocate the tool carriage rapidly, dogs adjustably positioned upon the base to limit the extent of carriage reciprocation, means to maintain the tool in cutting engagement with the work during reciprocation in both directions, and dogs adjustably positioned upon the base to engage the tool feeding mechanism at the end of each carriage stroke and automatically feed the cutting tool toward the work to a predetermined extent.

11. A turning lathe comprising a base having a rotatable work support thereon, means to rotate a work piece, a lathe tool, a carriage to support said tool, ways upon the base parallel to the work axis, a piston and cylinder mechanism to reciprocate the carriage upon the ways and move the tool longitudinally of the work in both directions, valve mechanism to control the same, dogs adjustably positioned upon the base, connections actuated by said dogs to automatically feed the lathe tool transversely of the carriage and towards the work axis at the end of each carriage stroke, manually operable mechanism for feeding the tool into the work, and means to disengage the automatic feed mechanism from the tool carriage and permit the tool to be fed manually.

12. A lathe comprising a rotatable work support, a driving motor adapted to rotate the work support at a high rate of speed, a tool support mounted upon the base for reciprocation lengthwise of the work, a suitable lathe tool shaped to cut in both directions of carriage reciprocation, a fluid pressure mechanism to reciprocate the tool support at a variable rate in both directions, means to vary said rate, dogs adjustably positioned upon the base to limit the extent of reciprocation of the tool support, precision feeding mechanism acting periodically to feed the tool forward through a predetermined distance into the work at each end of a reciprocatory stroke so that it will take only a shallow cut, the depth of which is such that the pressure of the tool against the work is very light as compared with the pressure of the tool when cutting at a slow speed.

13. A lathe for machining a rotating work surface comprising mechanism for rotatably supporting the work, a high speed lathe tool engaging the work, driving mechanism for rotating the work rapidly, reversible reciprocating mechanism for moving said lathe tool and the work relatively at a high rate of speed while causing the tool nose to take a series of shallow cuts as it traverses repeatedly across the work surface, the rates of work rotation and tool reciprocation being within but approaching the maximum cutting ability of the tool, and automatically operable precision feeding mechanism for feeding the tool periodically into the work at the end of a reciprocatory stroke so that it will take only a shallow cut, the depth of cut being such that the pressure of the tool against the work is very light as compared with the pressure capacity of the tool when cutting at a slow speed.

14. A lathe for machining the surface of a rotating work piece comprising mechanism for rotatably supporting the work, a high speed lathe tool engaging the work, a driving mechanism for rotating the work at a rapid rate, a reversible reciprocating mechanism for moving said lathe tool and the work relatively at a high rate of speed while causing the tool nose to take a series of shallow cuts as it traverses repeatedly across the work surface, the rates of work rotation and tool reciprocation being within but approaching the maximum cutting ability of the tool, and automatically operable precision feeding mechanism acting periodically to feed the tool forward through a predetermined distance into the work at both ends of a reciprocatory stroke so that it will take only a shallow cut, the depth of said cut being such that the pressure of the tool against the work is very light as compared with the pressure capacity of the tool when cutting at a slow speed.

15. A lathe comprising a rotatable work support, means to rotate said support at a rapid rate, a tool carriage supported for reciprocation relative to the work, a high speed lathe tool secured to said carriage and shaped to cut in either direction during reciprocation, means to reciprocate the tool carriage at a predetermined rapid but adjustable rate, and precision feeding mechanism acting periodically to feed the tool into the work through a predetermined distance at one end of its reciprocatory stroke so that the tool will take only a shallow cut, the depth of cut being such that the pressure of the tool against the work is very light as compared with the pressure capacity of the tool when cutting at a slow speed and the removal of stock depending primarily on the rates of work rotation and tool reciprocation.

16. A lathe for machining a rotating work surface comprising a mechanism for rotatably supporting the work, a plurality of high speed lathe tools engaging both sides of the work, a driving mechanism for rotating the work rapidly, a reversible reciprocatory mechanism for moving said lathe tools and the work longitudinally of the work while causing the tool noses to take a series of shallow cuts as they traverse repeatedly across the work surface, and automatically operable precision feeding mechanism acting periodically to feed the tools into the work for a predetermined distance at one end of said reciprocatory stroke so that they will take only a series of shallow cuts, the depth of said cuts being such that the pressure of each tool against the work is very light as compared with the pressure capacity of said tools when cutting at a slow speed and the removal of stock from the work depending primarily on the rates of work rotation and tool reciprocation.

17. A lathe comprising a rotatable work support, means to rotate said support at a rapid rate, a tool carriage supported for reciprocation relative to the work, a multiplicity of high speed cutting tools secured to said carriage and shaped to cut in either direction during reciprocation, means to rapidly reciprocate said tool carriage at a predetermined but adjustable rate, adjustable means to control the extent of reciprocation of said carriage, and precision feeding mechanism acting periodically to feed the tools towards and into the work through a predetermined distance at each end of its reciprocatory stroke, thereby causing the tools to take a succession of shallow adjacent cut without being withdrawn from the work, the depth of each cut being such that the pressure of the tool against the work is very light as compared with the pressure capacity of the tool when cutting at a slow speed and the removal of stock from the work depending primarily on the rates of work rotation and tool reciprocation.

18. A lathe comprising a rotatable work support, means to rotate said support at a rapid rate, a tool carriage supported for reciprocation lengthwise of the work, a plurality of high speed cutting tools secured thereto and shaped to cut in either direction during reciprocation along the work, means to rapidly reciprocate the tool carriage at a predetermined but adjustable rate, means to adjust the extent of said reciprocation, and precision feeding mechanism, including means for adjusting the same, which acts periodically to feed all of the tools simultaneously towards and into the work through a predetermined distance at each end of the reciprocatory stroke so that each tool will take only a shallow cut, the depth of said cut being such that the pressure of the tool against the work is very light as campared with the pressure capacity of said tool when cutting at a slow speed and the removal of stock from the work depending primarily on the rates of work rotation and tool reciprocation.

CHARLES H. NORTON.